even United States Patent (10) Patent No.: US 7,561,552 B2
Gross et al. (45) Date of Patent: Jul. 14, 2009

(54) METHOD FOR ADAPTIVE CHANNEL SIGNALING

(75) Inventors: Jonathan H. Gross, Gilbert, AZ (US); Ravi M. Adatrao, West Dundee, IL (US); Shawn W. Hogberg, Chandler, AZ (US); Daniel R. Tayloe, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 718 days.

(21) Appl. No.: 10/854,417

(22) Filed: May 25, 2004

(65) Prior Publication Data

US 2005/0265282 A1 Dec. 1, 2005

(51) Int. Cl.
*H04W 4/00* (2006.01)
(52) U.S. Cl. .................. 370/332; 370/333; 455/434; 455/458; 455/515
(58) Field of Classification Search ............ 370/329, 370/330, 331, 332, 333
See application file for complete search history.

(56) References Cited

U.S. PATENT DOCUMENTS

| 5,912,894 | A | 6/1999 | Duault et al. |
| 6,016,559 | A * | 1/2000 | Kim .................. 714/48 |
| 6,026,083 | A * | 2/2000 | Albrow et al. .......... 370/347 |
| 6,295,302 | B1 | 9/2001 | Hellwig et al. |
| 6,483,857 | B1 | 11/2002 | Sloan et al. |
| 6,542,739 | B1 | 4/2003 | Garner |
| 6,600,740 | B1 | 7/2003 | Valentine et al. |
| 6,643,262 | B1 | 11/2003 | Larsson et al. |
| 6,690,681 | B1 | 2/2004 | Preston et al. |
| 7,215,653 | B2 * | 5/2007 | Kim et al. .............. 370/329 |
| 2003/0174662 | A1 * | 9/2003 | Malkamaki ............. 370/310 |
| 2004/0102205 | A1 * | 5/2004 | Zhang et al. ............ 455/522 |
| 2004/0180675 | A1 * | 9/2004 | Choi et al. ............. 455/458 |
| 2004/0214590 | A1 * | 10/2004 | Al-Housami et al. ...... 455/515 |
| 2004/0266446 | A1 * | 12/2004 | Nguyen et al. .......... 455/450 |
| 2005/0007971 | A1 * | 1/2005 | Jeong et al. ............ 370/312 |

* cited by examiner

*Primary Examiner*—Vincent P Harper
*Assistant Examiner*—Mazda Sabouri

(57) ABSTRACT

This method (110) adaptively sends control messages and a predetermined number of fast repeats of the control messages on the traffic channel of a mobile communication system. For a control message which has already been lost (118), the system sends the control message again with a first number of fast repeats (130) if the traffic channel is operating at a full rate; and the system sends the control message with a second number of fast repeats if the traffic channel is operating at a subrate. The number of fast repeats is selectable. If the control message has not been previously sent and the traffic channel is operating at a subrate (124), the system will send the control message with a third number of fast repeats (128).

8 Claims, 4 Drawing Sheets

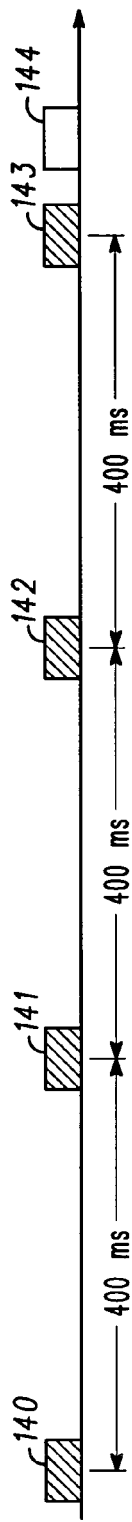
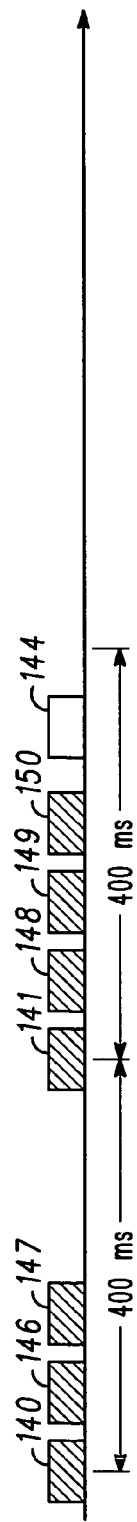
FIG. 3
FIG. 4
FIG. 5

METHOD FOR ADAPTIVE CHANNEL SIGNALING

BACKGROUND OF THE INVENTION

The present invention pertains to cellular communication systems and more particularly to a method for increasing the probability of signaling or control messages being successfully transmitted over the air in a cellular communication system.

For establishing voice communication between cellular users, control or signaling channels are required as well as a traffic channel. The traffic channel carries, among other things, voice samples of each person speaking. While the signaling or control channels contain system control information, for example, such as hand off related messaging for a moving cellular subscriber from one cell to another.

In current cellular communication systems, over the air controller signaling messaging is frequently performed "in-band". That is, when a call controller signaling message is required, bits or entire frames are "stolen" from the traffic channel which is used to carry the voice or data in order to carry the necessary signaling or control information. For example, in a cellular communication system, hand off direction messages, power control parameter messages, neighbor list updates, etc. may be sent to a mobile unit "in-band" on a traffic channel. If this "in-band" messaging occurs too frequently, it can negatively impact the voice quality of the traffic channel since bits are being omitted from a speech stream in order to carry signaling or control messages.

This may contrast with the fact that call control signaling information must be reliably transmitted in a fast manner in order to achieve good call performance, that is, a low dropped call rate and low noise RF traffic channels. One method to increase such call performance is to quickly or rapidly repeat certain call critical messages. Quick repeating is a process of sending the same message multiple times in rapid succession in order to increase the likelihood that a particular message will be received reliably by the mobile unit.

Existing communications that address this problem at all provide a static mechanism for quickly repeating call critical control messages. These methods do not take into account voice quality impacts or data throughput. Existing methodology may quickly repeat critical messages in a static fashion, but this typically has a negative impact on voice quality.

Accordingly, it would be highly desirable to have an adaptive method for in-band signaling for providing improved call reliability by the reception of call critical control or signaling messages while avoiding an impact upon voice quality of the traffic channel.

BRIEF DESCRIPTION OF THE DRAWINGS

FIG. 3 is a timing diagram of a full rate traffic channel in accordance with the present invention.

FIG. 4 is a timing diagram of a fast repeat retransmission in accordance with the present invention.

FIG. 5 is a timing diagram of a traffic channel subrate message transmission in accordance with the present invention.

PREFERRED EMBODIMENT OF THE INVENTION

Figure 1:
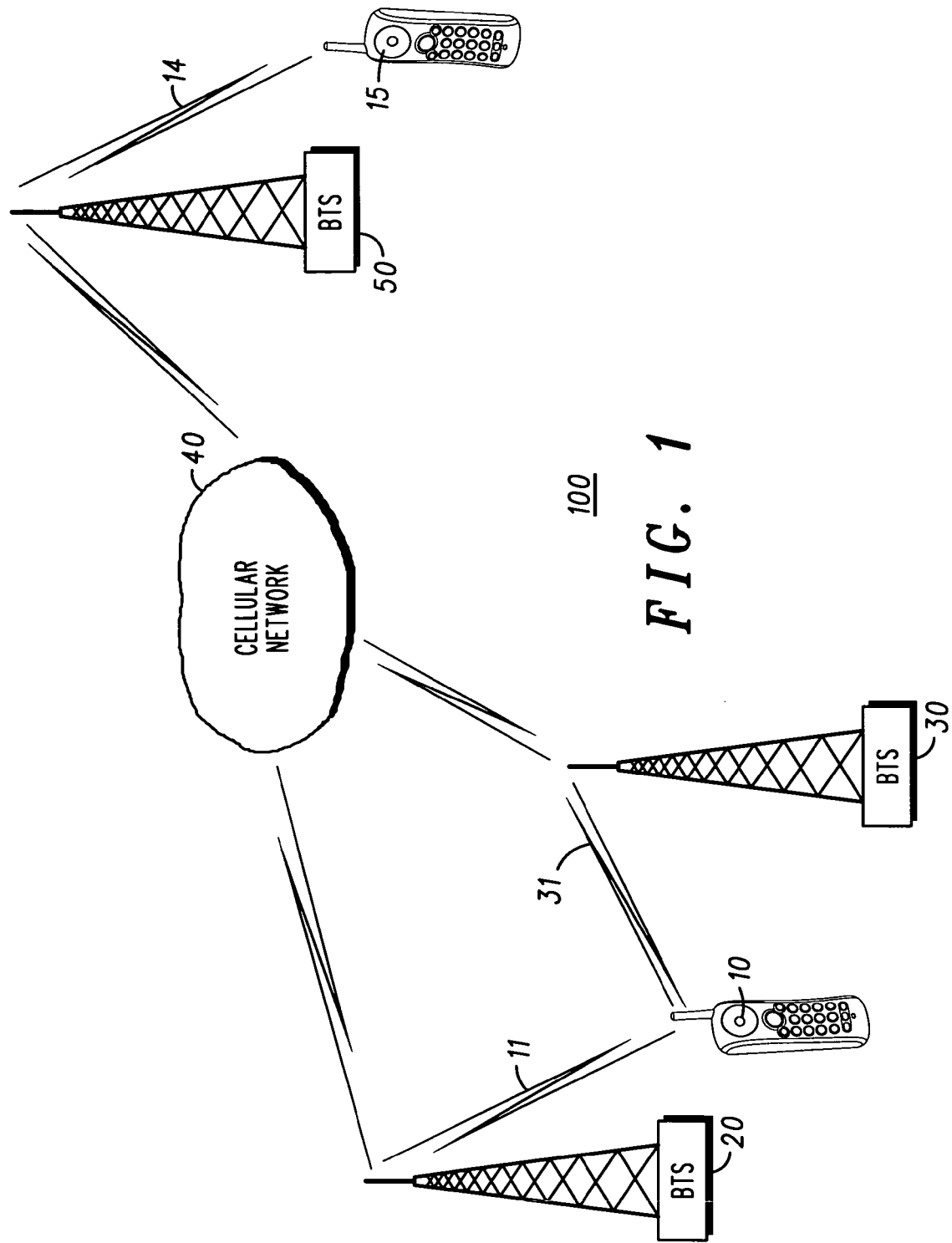
FIG. 1 is a block diagram of a cellular communication system in accordance with the present invention.
Figure 2:
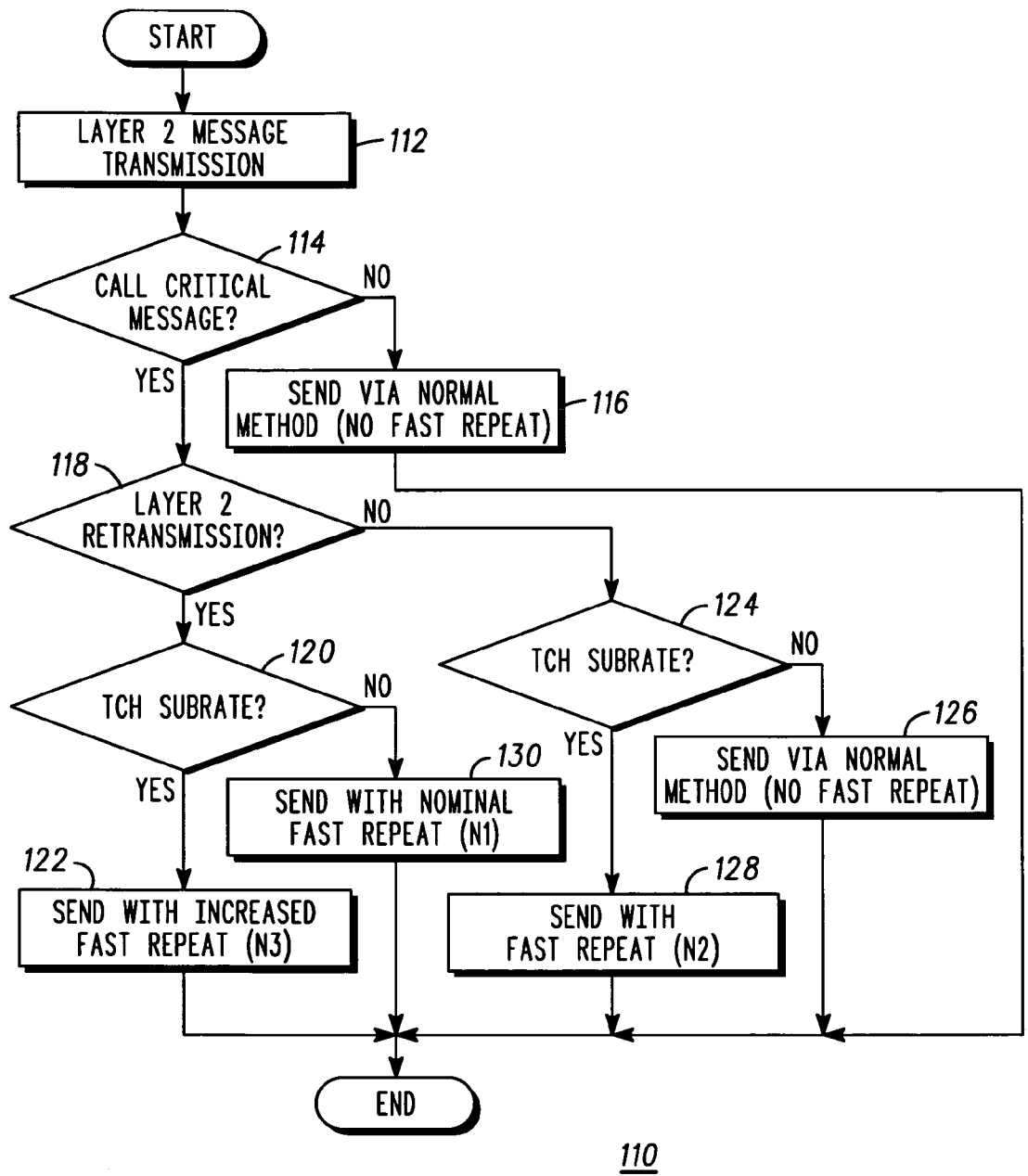
FIG. 2 is a flow chart of a method for adaptive channel signaling in accordance with the present invention.

Referring to FIG. 1, a block diagram of a cellular communication system 100 which supports a method for adaptive channel signaling 110 of FIG. 2 is shown. The communication system 100 which embodies the present invention may include a CDMA (Code Division Multiple Access), TDMA (Time Division Multiple Access), GSM (General System Mobile), UMTS (Universal Mobile Telecommunication System) or other such cellular based communication systems. Cellular communication system 100 includes base station transceiver (BTS) 20 coupled to mobile unit 10 via link 11. Link 11 is also termed a traffic channel. Link 11 links via wireless communication mobile unit 10 through base station 20 to the cellular network 40. Similarly, mobile unit 15 is coupled via a link or traffic channel 14 to base station transceiver (BTS) 50 to the cellular network 40. Mobile units 10 and 15 may be connected to one another via cellular network 40 in a voice conversation or mobile unit 10 may be transmitting data to mobile unit 15 or to a wire line unit (not shown).

It is well known that voice activity is typically less than fifty percent of the over the air time available for a cellular communication system. Also, data transmission activity is significantly less than one hundred percent of the traffic channel capacity. Since the traffic channel is not being used continuously to carry full rate voice traffic, then signaling frames may be sent during periods when the traffic channel is not one hundred percent used, less than full rate, without negatively impacting voice quality or data throughput.

Full rate means that the traffic channel, which has a fixed bandwidth associated with it (e.g. in CDMA, a fundamental traffic channel is either 9.6 or 14.4 kbps), is operating at "full rate", or that the maximum associated bandwidth for that channel is being used. A traffic channel can operate at ½ rate, ¼ rate, ⅛th rate. So for a 9.6 kbps CDMA fundamental traffic channel, it can dynamically switch between 9.6 kbps (full rate), 4.8 kbps (½ rate), etc. depending on what needs to be sent over the traffic channel. Typically, when voice is active, the channel is operated at full rate to send the speech voice frames. But during speech pauses, the channel is operated at lower rates, typically ⅛th rate, to conserve transmit power since less "bits" need to be sent over the air during these periods of voice inactivity.

The adaptive channel signaling method described herein adaptively tailors the cellular signaling or control messaging based upon the state of the traffic channel.

Control or signaling messages may be fast repeated to insure that they are received from the communication system, specifically the base station transceiver 20, to the mobile unit 10, for example.

Fast repeats are the transmission of the same message multiple times. This can be done to improve the probability of the message actually getting over the air interface successfully in adverse RF conditions. In cellular systems, frames transmitted over the air can be erased. In some cases, it is critical to get signaling over the air reliably and quickly, for example, when executing handoffs. Therefore, it is desirable to quickly ("fast") send multiple copies of the same message to the mobile (w/o even waiting for an acknowledgment of the first message). This is referred to as "fast repeats". By sending multiple copies of the same message in rapid succession, the probability of the message getting to the mobile both quickly and reliably is improved. An increased number of fast repeats can be used when the channel is not being used to send voice frames (i.e. when its not full rate), without an impact on voice quality (more on this below). When the channel is being used to send voice frames, a reduced number (or possibly no) fast repeats would be used, in order to reduce the impact on voice quality.

Generally this adaptive channel signaling method determines when the traffic channel is actively being used to carry user voice or data traffic. When the traffic channel is operating at full rate, signaling messages are not fast repeated or may be fast repeated a reduced number of times in order to avoid negative impact on speech quality or data throughput. When the channel is not actively being used to carry substantial user voice or data, the traffic channel is said to be in a reduced rate or subrate state. In this case, signaling messages are fast repeated an increased number of times in order to improve the probability of successful and rapid delivery of call critical messages. These call critical messages include hand off and power control messages from the system to the mobile unit, for example.

For example when executing a CDMA soft handoff, consider the following. Suppose the call is in 1-way handoff, meaning the mobile, 10, is communicating with only a single base station, BTS 20. In this case, there is no spatial diversity in the call, so the call is more vulnerable to fades and RF blocking since it has only an active traffic channel to only a single base station. Now suppose the mobile is moving down the road and gets close enough to a second basestation where the mobile realizes it should add this second basestation 30 to the call (i.e execute a soft handoff), which will improve the overall link conditions by adding a second good leg (over the air interface) 31 to the call to a second basestation 30, which will provide spatial diversity for the call (much less susceptibility to RF fades, shadowing, etc.).

Typically a fast repeat of the hand off message would be sent. That is, the communication system would send the original hand off message plus one rapidly repeated copy. The cellular network 40 sends a hand off direction message to mobile unit 10 commanding mobile unit to add the second link or leg 31 through BTS 30 to the call. In this case, for example, it would be desirable to send three copies of the same hand off direction message to the mobile unit 10 in rapid succession. If the traffic channel is not at full rate, then three copies would be sent in rapid succession. However, if the traffic channel is at full rate, one or perhaps two of the copies of the hand off direction message would be sent to mobile unit 10 since sending more would impact the voice quality of the call.

Referring to FIG. 2, a flow chart embodying the method for adaptive channel signaling is shown. The process is started and block 112 is entered. A layer two message transmission is requested, block 112. A layer two (L2) transmission is described in the CDMA standard, for example. Messages sent at layer 2 require an acknowledgment message be returned in order to stop retransmissions of the message. An example would be BTS 20 forwarding an L2 handoff direction message from the network 40 to mobile unit 10 which must send an acknowledgement back to BTS 20 to be forwarded back to the network 40. See FIG. 3. Signaling message 140 is sent and 400 milliseconds later signaling message 141 is sent. After another 400 milliseconds, signaling message 142 is sent and finally after another 400 millisecond interval, signaling message 143 is sent. When the network 40 receives the acknowledge message 144, no further signaling messages are sent.

Returning again to FIG. 2, next, block 114 determines whether the message is call critical. That is, certain messages are deemed call critical, for example, hand off direction messages, power control messages and neighbor list updates may be designated call critical messages. If the message to be sent is not a call critical message, block 114 transfers control to block 116 via the no path. Block 116, the communication network 40 sends the non-call critical message via a normal method, that is, no fast repeats. Refer to FIG. 3. The message is sent every 400 milliseconds until an acknowledgement is received.

If the network 40 determines that the message is a call critical message, block 114 transfers control to block 118 via the yes path. Block 118 determines whether the message being sent is a layer 2 retransmission, in the CDMA example. If the call critical message is not a retransmission, block 118 transfers control to block 124 via the no path. Block 124 determines whether the traffic channel is currently operating at a subrate. Subrate refers to when the channel is operating at less than its full, or maximum, rate. For example, ½ rate, ¼ rate, ⅛ rate. If the traffic channel is not operating at a subrate, it means that the traffic channel is operating at the full rate and block 124 transfers control to block 126. Block 126 sends the message via the normal method, that is, no fast repeats. Refer to FIG. 3. The process is then ended.

If the network 40 determined that the traffic channel was operating at a subrate, block 124 transfers control to block 128 via the yes path. Since this is a layer two retransmission, block 118 and the traffic channel (TCH) is operating subrate, block 124, the network 40 sends the original message along with N2 repeats. N2 is equal to three in this case. Since the traffic channel is operating at a subrate, voice quality will not be much impacted if the fast repeat of the message is used. Therefore, referring to FIG. 5, original message 141 is sent followed by three fast repeats 148, 149 and 150. This occurs until acknowledgment message 144 is received. The process is then ended.

For a layer two retransmission, block 118 transfers control to block 120 via the yes path. Block 120 determines whether the traffic channel is operating at subrate. The call critical message has already been sent once at layer two, but no acknowledgment was received for this message. The message must now be retransmitted at layer two. The traffic channel is not carrying very much speech since it is operating at subrate. Since the initial transmission of the call critical message failed, the link is probably poor at this point. Block 120 transfers control to block 122 via the yes path. Since the channel is operating at subrate, fast repeats will not impact voice quality. As a result, the call critical message is sent with increased fast repeats of N3. In this case N3 is equal to four. So a retransmission of the call critical message is performed with four fast repeats. The process is then ended.

If the traffic channel is not operating at subrate, block 120 transfers control to block 130 via the no path. Since this is a retransmission, the call critical message was already sent, once at layer two, but no acknowledge was received. The link therefore is in poor condition. The traffic channel however is carrying substantial amounts of voice. So it is highly desirable to minimally impact the voice quality. In this case the message should be fast repeated but not four times. As a result, the original call critical message is sent with N1 fast repeats. In this case N1 is equal to two. The process is then ended.

The present method determines whether a first attempt of a critical message transmission has been made. Further, the method determines whether the traffic channel is operating at full rate or a subrate. The method adapts the traffic channel to a number of fast repeats depending on the rate of the channel and the likely impact on voice quality. As a result this method improves the following: signaling robustness, dropped call rates and overall call performance without negatively impacting voice quality.

Figure 6:
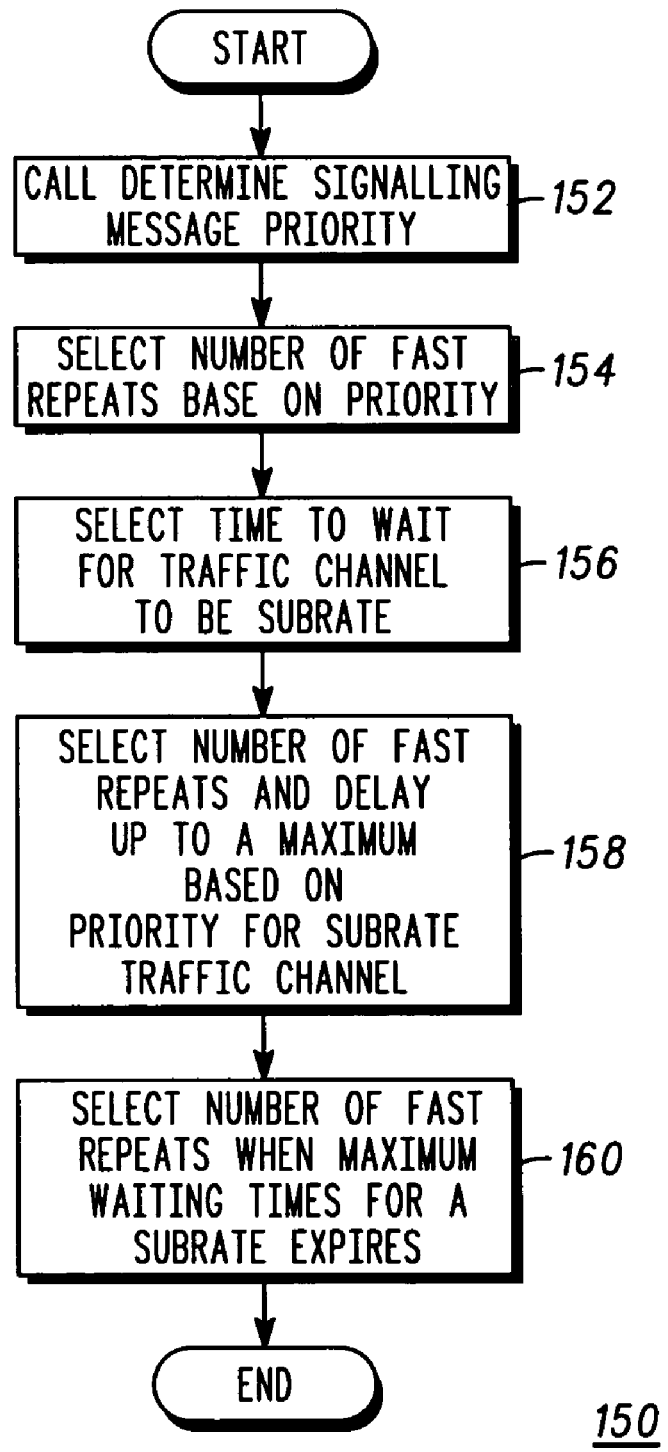
FIG. 6 is a flow chart of an alternate embodiment of the method in accordance with the present invention.

In an alternative embodiment 150 in FIG. 6, different call signaling message types can be assigned different priorities, and these priorities can be used to determine the number of fast repeats employed as a function of the rate of the underlying traffic channel. For example, handoff direction messages could be assigned a high priority, and power control parameter update messages could be assigned a lower priority.

High priority messages could be fast repeated an increased number of times relative to lower priority messages. This improves the probability of these critical messages being delivered quickly and reliably, relative to lower priority messages, while minimizing the overall impact on voice quality (i.e. not transmitting more copies of a given message over the air than necessary, based on its priority).

Lower priority messages could be delayed prior to sending the fast repeats of the message. Speech frequently transitions between periods of activity and inactivity (or voice pauses). If the channel is full rate, it may soon transition to subrate (i.e. there may be a speech pause imminent). Fast repeats of lower priority messages could be delayed waiting for the channel to become subrate, at which point the fast repeats could be sent. If after waiting a maximum period of time (for example, in the range of 200-300 ms.), and no voice pause occurs, then the fast repeats would not be sent at all. However, if the channel transitions to subrate during this time interval, then the fast repeats would be sent. The amount of time to "wait" for the channel to become subrate could be a function of the message priority.

The number of copies of the message to send initially, and also when the timer expires, could also be a function of the message priority. For example, a high priority message would be sent once immediately regardless of whether the channel is full rate or not. If the channel is not full rate, then 4 copies of the message would be sent immediately. If the channel IS full rate, then the initial message would be sent right way, then wait up to 120 ms. for example for the channel to transition to subrate. If the channel transitions to subrate during this time interval, the waiting 3 remaining copies of the message would be sent immediately. If the full 120 ms passes and the channel is still full rate, then either a) send the waiting 3 remaining copies, or more likely b) send a reduced number of copies (0 or 1, for example). On the other hand, a low priority message would be sent once right away, and then wait up to a maximum time 240 ms for example for the channel to transition to subrate. If the channel transitions to subrate during this time, then 2 more copies of the message would be sent fore example. On the other hand, if the full 240 ms goes by and the channel is still full rate, then the remaining copies would not be sent since it is a low priority message.

So the priority could be used to determine (a) the initial number of messages to send, (b) the amount of time to wait for the channel to become subrate, (c) the number of fast repeats to send (both initially, and when the channel becomes subrate), (d) the number of messages to send when the maximum amount of time waiting for the channel to become subrate expires.

Referring to FIG. 6, an alternate embodiment 150 is shown for basing the number of fast repeats as well as waiting times on a priority of the call signaling message. For example, a hand off direction message may be a high priority message while a power control message may be a lower priority message. Block 152 determines the call signaling message priority in accordance with a pre-established definition (not shown). Next, the initial number of fast repeats is selected based upon the priority of the message. The message is sent and repeated the number of times selected, block 154.

Next, in block 156 the time to wait for the traffic channel to be subrate is selected. Then the number of fast repeats and delay or wait time based upon the priority of the subrate traffic channel is selected, block 158. When the maximum waiting time for the traffic channel to become subrate expires, the number of fast repeats is selected based upon the priority of the message, block 160.

A method 150 is shown for basing the number of fast repeats on a message priority. This provides the advantage of distinguishing between various call critical messages by the communication system and tailoring the number of fast repeats to the relative priority of the message.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A method for adaptive channel signaling for a traffic channel with a mobile unit in a mobile communication system, the method comprising the steps of:
   determining whether a control message is a critical message;
   determining whether the control message is a retransmission;
   if the control message is the critical message, determining whether the traffic channel is operating at a subrate indicating that the speech level on the traffic channel is reduced;
   if the traffic channel is operating at the subrate, sending the critical message and a number of fast repeats of the critical message on the traffic channel;
   if the control message is the retransmission, the number of fast repeats of the critical message on the traffic channel to the mobile unit being an increased number of fast repeats that is greater than the number of fast repeats of the critical message; and
   if the control message is the retransmission and the traffic channel is not operating at the subrate, the number of fast repeats of the critical message on the traffic channel to the mobile unit being a nominal number of fast repeats that is less than the number of fast repeats.

2. The method as claimed in claim 1, there are no fast repeats being sent if it determined that the control message is not a retransmission.

3. The method as claimed in claim 1, wherein if the control message is not a critical message, there is farther included a step of sending the control message on the traffic channel.

4. The method as claimed in claim 1, wherein the mobile communication system includes a Code Division Multiple Access mobile communication system.

5. The method as claimed in claim 1, wherein the mobile communication system includes a Time Division Multiple Access mobile communication system.

6. The method as claimed in claim 1, wherein the mobile communication system includes a Global System Mobile communication system.

7. In a cellular communication system, a method for adaptive channel signaling for a traffic channel, the method comprising the steps of:
   determining whether a control message is a critical control message;
   determining whether the critical control message is a retransmission of the critical control message;
   if the critical control message is not a retransmission and the traffic channel is operating at a subrate indicating the speech level on the traffic channel, sending the critical control message and a first number of increased fast repeats of the critical control message on the traffic channel;

if the critical control message is the retransmission and the traffic channel is operating at the subrate indicating the speech level on the traffic channel, sending the critical control message and a second number of increased fast repeats of the critical control message on the traffic channel; and if the critical control message is a retransmission and the traffic channel is not operating at the subrate, sending the critical control message and a third number of increased fast repeats of the critical control message on the traffic channel;

wherein the second number of increased fast repeats of the critical control message is greater than the first number of increased fast repeats of the critical control message; and wherein the third number of increased fast repeats of the critical control message is less than the first number of increased fast repeats of the critical control message.

8. The method as claimed in claim 7, wherein if the control message is not a critical control message, there is further included a step of sending the control message on the traffic channel to a mobile unit.

* * * * *